June 22, 1943.  L. H. MORIN  2,322,537
SEPARABLE FASTENER
Filed May 23, 1942
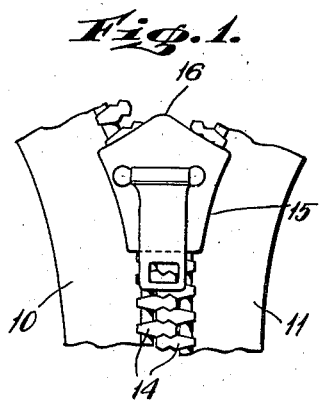
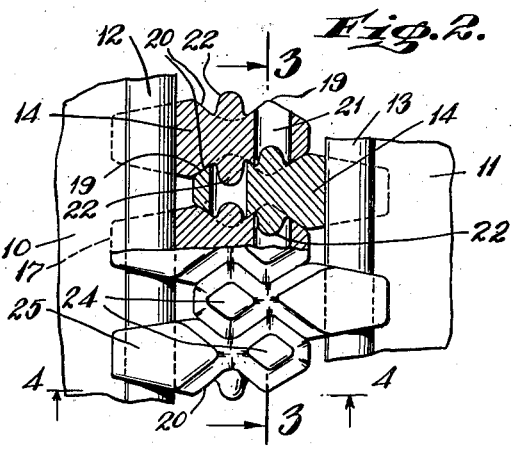
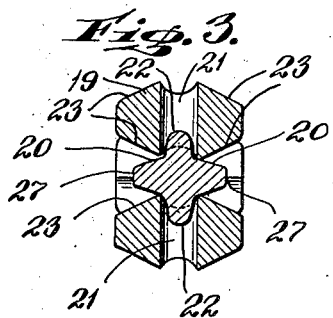
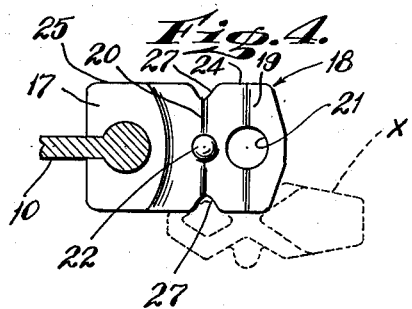
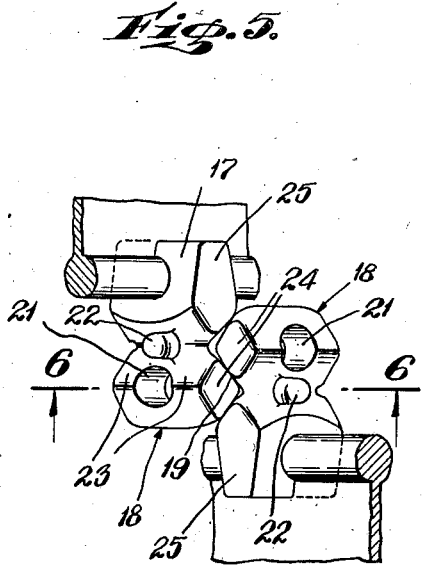
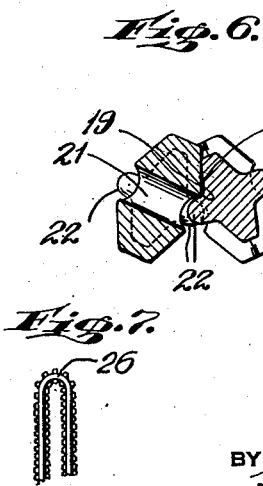
INVENTOR
LOUIS H. MORIN
BY
ATTORNEYS Patented June 22, 1943

2,322,537

UNITED STATES PATENT OFFICE 2,322,537

SEPARABLE FASTENER

Louis H. Morin, Bronx, N. Y., assignor of one-half to Davis Marinsky, Bronx, N. Y.

Application May 23, 1942, Serial No. 444,189

18 Claims. (Cl. 24—205)

This invention relates to separable fasteners employing scoops of the double acting type for what might be termed universal mounting of sliders on the stringers of such fasteners. More particularly, the invention relates to fasteners of this kind having three independent coupling phases preventing accidental or forcible separation of coupled stringers regardless of the arrangement or position assumed by the stringers. The novel features of the invention will be best understood from the following description when taken together with the accompanying drawing, in which certain embodiments of the invention are disclosed, and in which the separate parts are designated by suitable reference characters in each of the views; and in which:

Fig. 1 is a plan view of a small portion of two stringers made according to my invention and indicating a slider thereon.

Fig. 2 is an enlarged sectional detail view showing the engagement between the links of opposed stringers.

Fig. 3 is a partial section on the line 3—3 of Fig. 1 illustrating engagement of two links of one stringer with the link of an opposed stringer.

Fig. 4 is a partial section on the line 4—4 of Fig. 2 illustrating one link of one stringer only.

Fig. 5 is an inside perspective view indicating the approximate position of two adjacent and coupled links of stringers when the stringers are sharply folded.

Fig. 6 is a partial section on the line 6—6 of Fig. 5; and

Fig. 7 is a diagrammatic view showing folded stringers.

In the construction of separable fasteners of the kind under consideration, it has been customary to provide interlocking engagement between the links or scoops of the stringers to prevent accidental separation of coupled stringers when subjected to normal strains or flexures. These links have had a two phase engagement, one supporting the links against lateral separation, the other against transverse or crosswise movement. But the separation of such links or scoops in extreme flexure or folding of the stringer has been possible and this separation has been objectionable and has caused considerable inconvenience and annoyance to the users of separable fasteners.

In addition to providing a double acting link or scoop structure having two sets of male and female coupling portions at opposed surfaces of each link or scoop, which provides the two normal phases of locking engagement between the links or scoops, it is a further feature of my invention to provide means establishing a third interlocking phase between the links or scoops which is effective through any possible angular relationship of adjacent coupled links one with respect to the other, and by this added third locking or coupling phase, the possibility of separating coupled stringers when sharply folded is rendered impossible. It will, therefore, be apparent that accidental separation of coupled stringers is eliminated, thus providing in devices of this type and kind the maximum amount of efficiency in maintaining positive coupling engagement between the stringers.

In Figs. 1 and 2 of the drawing, 10 and 11 represent portions of two stringer tapes, to the beaded edges 12, 13 of each of which are attached spaced coupling links or scoops 14.

As each link or scoop is of the same construction, a brief description of one will apply to all. In Fig. 1, 15 represents a conventional type of slider which is movable along the stringers in coupling and uncoupling the links or scoops thereof. By reason of the double acting characteristics of the links or scoops 14, the wide end 16 of the slider may be arranged to extend in either direction on the stringers. In other words, with stringers of this kind, it will be apparent that two or more sliders may be arranged on the stringers with narrow or wide ends of the sliders in opposed relationship.

Each link or scoop 14 comprises a mounting end 17 which engages the beaded edges 12, 13 of the stringers and protruding beyond these beaded edges are coupling end portions 18. Opposed surfaces of the coupling end portions have triangular projections 19 at their outer ends with corresponding recesses 20 at inner end portions thereof, the latter being adapted to receive the projections 19 of the links or scoops of an opposed stringer, as clearly seen in Fig. 2 of the drawing. Extending centrally through the projections 19 is an aperture 21 which is adapted to receive projection knobs or pins 22 arranged centrally of the recesses 20 of the links or scoops of an opposed stringer.

The interengaging male and female elements 19 and 20 interlock the links or scoops against lateral separation; whereas the pin and sockets formed by the pins 22 and apertures 21 key the links or scoops against transverse or crosswise separation. Where this is all that is required, the surfaces of the projections 19 and recesses 20 will be straight across the links or scoops to the side surfaces thereof. However, in the present illustration, the surfaces of the projections 19 and recesses 20 are bevelled to opposite sides of the links or scoops to form the bevelled surfaces 23, as clearly illustrated in Fig. 3 of the drawing. The bevelling of these surfaces results in forming diamond shaped flat sections 24 on opposite sides of the links or scoops and substantially dart shaped sections 25 on the remainder of said side surfaces which extend onto the mounting ends 17 of the links or scoops.

It will thus be seen from a consideration of the lower part of Fig. 2 of the drawing that these bevelled surfaces of opposed links form wide outwardly flaring channels on opposite side surfaces of coupled links. These channels or recesses provide a free swinging or rocking movement of the links one upon the other in the manner illustrated in Figs. 5 and 6 of the drawing. However, when these links are rocked on each other into this position, a locking engagement is established and maintained between adjacent links by reason of the projecting member 19 of one link seating in the socket 20 of the adjacent link. This establishes the third phase of interlocking and coupling engagement between the links or scoops even when the adjacent links or scoops or the central portion thereof is at an angle of substantially 45° to each other, which is about the maximum of swinging or rocking movement that will be provided by virtue of the check in this movement by the stringer tapes or other mounting for the links or scoops. However, assuming that it were possible to move adjacent links at 90° to each other, which would actually represent bringing the stringer tapes substantially directly upon each other where folded, an interlocking engagement would still be maintained by the members 19 and sockets 20 of the adjacent links and this is indicated by the diagrammatic dotted line showing, as at X, of one link with respect to the link shown in full lines in Fig. 4.

The foregoing additional interlock between the stringers will be understood more clearly when it is remembered that with conventional link or scoop constructions adjacent surfaces of the links or scoops beyond the couplings equivalent to the sockets 21 and 22 are flat and parallel. These flat parallel surfaces of adjacent links in the rocking of the links one upon the other as above described in sharp folding of a fastener, actually act as a cam to throw adjacent links or scoops out of engagement with each other. Thus it has been possible to separate coupled stringers deliberately or accidentally. With my construction, I have eliminated this camming of opposed surfaces and instead have constructed on the links or scoops additional interlocking surfaces which provide a more free flexure or folding of the stringer and also maintain a locked engagement between the stringers even though they are sharply or abruptly folded.

In addition to providing the third phase interlocking engagement between the links or scoops and the greater flexibilty in the resulting coupled fastener, the outwardly flaring recesses or channels provided at the side surfaces of the stringers also prevent clogging or congestion of the fastener, particularly when the same is subjected to the exposure to mud and other similar foreign bodies which might collect on the fastener. These flaring channels facilitate quick and free removal of such foreign particles. In other words, from a consideration of Fig. 3 of the drawing, it will be apparent that the transverse surface engagement between adjacent links represents a third or less of the complete transverse dimension of the links or scoops.

From a consideration of Fig. 6 of the drawing, it is pointed out that, while in the sharp rocking of adjacent links the pins 22 may move entirely out of the apertures or sockets 21, the links can still not be pushed apart in that the tape, in this position of the links, is abruptly folded and under this condition prevents any relative movement of the links in this disengaging direction. As a matter of fact, adjacent links beyond the two shown are not so sharply rocked with respect to each other and do maintain an interlocking engagement between the pin and sockets.

In view of the fact that the links or scoops are bevelled to both side surfaces thereof, it will be apparent that each link may rock on its adjacent link to either side thereof, which provides sharp folding of the fastener in the direction of either side of the stringer tapes. In some instances, it might be desirable to dispense with the flexure of free rocking in the direction of one side surface of the fastener. In such instances, the bevelled surfaces 23 at such side would be dispensed with; but for most uses, the universal coupling properties which are provided by this link or scoop construction are desirable. At this time, it is also well to mention that in referring to a third phase lock or coupling, the third phase is operable at both side surfaces of the links or scoops.

Fig. 7 of the drawing illustrates diagrammatically the edge portion of a fastener assuming that the stringers are coupled together and in this figure, 26 represents the sharp fold in the fastener. It will be apparent, however, that the size of the links or scoops employed will govern the degree of sharpness of this fold in that the links prevent the tapes of the stringers from coming in direct contact with each other at the fold 26, at least that part of the tapes on which the links or scoops are arranged.

It will appear from a consideration of Fig. 4 of the drawing that side surfaces of the links or scoops have V-shaped notches or recesses 27 between the surfaces 24 and 25 and these notches or indentures are centralized with the base of the recess 20. In the right angle arrangement of the links or scoops one with respect to the other, the notches 27 partially establish the interlocking engagement with the members 19 adjacent the diamond surfaces 24.

The pins 22 are preferably of smaller diameter than the diameter of the apertures or sockets 21 to provide free non-binding engagement of the pin and sockets, the outer ends of the pins being rounded to freely pass into the sockets in coupling the stringers by operation of the slider. It will also appear that the outer bevelled walls 23 of the members 19 establish between the links or scoops a more free interlocking engagement in coupling said stringers. It will also be apparent that the angularity of the bevelled surfaces 23 may be varied to provide different coupling engagement between the links of the resulting fastener.

It will, of course, be apparent that while I have shown the third phase coupling or locking engagement between the links or scoops as applied to a particular type and kind of link or scoop structure or one employing specific couplings 19, 20, 21 and 22, that this third phase coupling engagement is applicable to links or scoops having other first and second phases.

Having fully described my invention, what I claim as new and desire to secure by Letters Patent is:

1. A separable fastener comprising stringers adapted to be coupled and uncoupled by a slider movable along the stringers, each stringer having links spaced longitudinally of one edge thereof, said links having projecting members on opposed surfaces, inwardly of which are recesses adapted to receive the projecting members of the links of an opposed stringer, that part of the link having the projections including an aperture opening through both surfaces of the link centrally thereof, and the recessed portion of the link having projecting elements adapted to enter the apertures in the links of an opposed stringer.

2. A separable fastener comprising stringers adapted to be coupled and uncoupled by a slider movable along the stringers, each stringer having links spaced longitudinally of one edge thereof, said links having projecting members on opposed surfaces, inwardly of which are recesses adapted to receive the projecting members of the links of an opposed stringer, that part of the link having the projections including an aperture opening through both surfaces of the link centrally thereof, the recessed portion of the link having projecting elements adapted to enter the apertures in the links of an opposed stringer, and said projecting members and recesses being formed by correspondingly bevelled walls on said surfaces of the links, forming substantially diamond shaped coupling ends on said links.

3. A separable fastener comprising stringers adapted to be coupled and uncoupled by a slider movable along the stringers, each stringer having links spaced longitiudinally of one edge thereof, said links having projecting members on opposed surfaces, inwardly of which are recesses adapted to receive the projecting members of the links of an opposed stringer, that part of the link having the projections including an aperture opening through both surfaces of the link centrally thereof, the recessed portion of the link having projecting elements adapted to enter the apertures in the links of an opposed stringer, said projecting members and recesses being formed by correspondingly bevelled walls on said surfaces of the links, forming substantially diamond shaped coupling ends on said links, the mounting end portions of the links being of less width than the widest part of the links, and said elements comprising pins having rounded ends.

4. A separable fastener comprising stringers adapted to be coupled and uncoupled by a slider movable along the stringers, each stringer having links spaced longitudinally of one edge thereof, said links having projecting members on opposed surfaces, inwardly of which are recesses adapted to receive the projecting members of the links of an opposed stringer, that part of the link having the projections including an aperture opening through both surfaces of the link centrally thereof, the recessed portion of the link having projecting elements adapted to enter the apertures in the links of an opposed stringer, said members and recesses being formed by correspondingly bevelled walls, and said walls being also contracted to opposite side surfaces of the links, forming between adjacent coupled links outwardly flaring recesses facilitating free rocking movement of the links one upon the other.

5. A separable fastener comprising stringers adapted to be coupled and uncoupled by a slider movable along the stringers, each stringer having links spaced longitudinally of one edge thereof, said links having projecting members on opposed surfaces, inwardly of which are recesses adapted to receive the projecting members of the links of an opposed stringer, that part of the link having the projections including an aperture opening through both surfaces of the link centrally thereof, the recessed portion of the link having projecting elements adapted to enter the apertures in the links of an opposed stringer, said members and recesses being formed by correspondingly bevelled walls, said walls being also contracted to opposite side surfaces of the links, forming between adjacent coupled links outwardly flaring recesses facilitating free rocking movement of the links one upon the other, and the first named surfaces of the links being contracted in the direction of the mounting end of said links.

6. In separable fastener stringers having links spaced longitudinally of one edge thereof, each link of the stringer having similar opposed surfaces, said surfaces having at the outer end of the link a projecting member extending across the thickness of the link, said surfaces having inwardly of said members corresponding recesses adapted to receive the members of the links of an opposed stringer, and said members and recesses, centrally of the links, being provided one with a projecting element and the other with a socket to receive the element of the link of an opposed stringer.

7. In separable fastener stringers having links spaced longitudinally of one edge thereof, each link of the stringer having similar opposed surfaces, said surfaces having at the outer end of the link a projecting member extending across the thickness of the link, said surfaces having inwardly of said members corresponding recesses adapted to receive the members of the links of an opposed stringer, said members and recesses, centrally of the links, being provided one with a projecting element and the other with a socket to receive the element of the link of an opposed stringer, said members and recesses being formed by correspondingly bevelled walls on said surfaces, and said walls being contracted in the direction of the side surfaces of the link.

8. In separable fastener stringers having links spaced longitudinally of one edge thereof, each link of the stringer having similar opposed surfaces, said surfaces having at the outer end of the link a projecting member extending across the thickness of the link, said surfaces having inwardly of said members corresponding recesses adapted to receive the members of the links of an opposed stringer, said members and recesses, centrally of the links, being provided one with a projecting element and the other with a socket to receive the element of the link of an opposed stringer, said members and recesses being formed by correspondingly bevelled walls on said surfaces, said walls being contracted in the direction of the side surfaces of the link, and the side surfaces of the link having V-shaped notches in central alinement with the recessed portions of said link.

9. In separable fastener stringers having links spaced longitudinally of one edge thereof, each link of the stringer having similar opposed surfaces, said surfaces having at the outer end of the link a projecting member extending across the thickness of the link, said surfaces having inwardly of said members corresponding recesses adapted to receive the members of the links of an opposed stringer, said members and recesses, centrally of the links, being provided one with a projecting element and the other with a socket to receive the element of the link of an opposed stringer, said members and recesses being formed by correspondingly bevelled walls on said surfaces, said walls being contracted in the direction of the side surfaces of the link, the side surfaces of the link having V-shaped notches in central alinement with the recessed portions of said link, and said notches dividing the side surfaces of the link into spaced flat areas, one of which is diamond shaped in form.

10. In separable fasteners employing stringers having links adapted to be coupled and uncoupled by a slider movable along the stringers, means centrally and longitudinally of the links retaining coupled links against lateral separation, means on the links keying the same against transverse separation, and additional means at side portions of the links keying the links against lateral separation when adjacent links are rocked one upon the other from a normal position to the limit of rocking movement.

11. In separable fasteners employing stringers having links adapted to be coupled and uncoupled by a slider movable along the stringers, means centrally and longitudinally of the links retaining coupled links against lateral separation, means on the links keying the same against transverse separation, additional means at side portions of the links keying the links against lateral separation when adjacent links are rocked one upon the other from a normal position to the limit of rocking movement, and said last named means comprising outwardly flared surfaces on adjacent links and of irregular contour lengthwise of said links.

12. In separable fasteners employing stringers having links adapted to be coupled and uncoupled by a slider movable along the stringers, means centrally and longitudinally of the links retaining coupled links against lateral separation, means on the links keying the same against transverse separation, additional means at side portions of the links keying the links against lateral separation when adjacent links are rocked one upon the other from a normal position to the limit of rocking movement, said last named means comprising contracted bevelled surfaces on the links forming between adjacent links outwardly flaring recesses, and said bevelled surfaces of adjacent links having means keying adjacent links against lateral separation.

13. The combination with the links of stringers of separable fasteners having means coupling the links of opposed stringers against lateral and transverse separation, of means on adjacent coupled portions of the links providing free rocking movement of the coupled links one upon the other in the direction of either side surface of the stringer, and said means including means maintaining locking engagement between adjacent coupled links throughout the full rocking movement of said links in folding the coupled stringers in the direction of either side surface thereof.

14. The combination with the links of stringers of separable fasteners having means coupling the links of opposed stringers against lateral and transverse separation, of means on adjacent coupled portions of the links providing free rocking movement of the coupled links one upon the other in the direction of either side surface of the stringer, said means including means maintaining locking engagement between adjacent coupled links throughout the full rocking movement of said links in folding the coupled stringers in the direction of either side surface thereof, and all of the links of each stringer having common opposed coupling surfaces providing universal mounting and operation of sliders on said stringers.

15. A double acting scoop for stringers of separable fasteners, comprising a scoop body having a mounting end portion and a coupling end portion, opposed surfaces of the coupling end portion of the scoop being of common construction and having projecting members and recesses to provide one coupling engagement, pins and sockets to provide another coupling engagement, and other means providing coupling engagement between adjacent coupled scoops in rocking one scoop of one stringer through an arc of 90° with respect to an adjacent scoop of an opposed stringer.

16. A double acting scoop for stringers of separable fasteners, comprising a scoop body having a mounting end portion and a coupling end portion, opposed surfaces of the coupling end portion of the scoop being of common construction and having projecting members and recesses to provide one coupling engagement, pins and sockets to provide another coupling engagement, other means providing coupling engagement between adjacent coupled scoops in rocking one scoop through an arch of 90° with respect to an adjacent scoop, and said last named means comprising angularly disposed continuations of first named members and recesses.

17. The combination with stringers of separable fasteners having interengaging stringers provided with means preventing separation of the coupled stringers in normal flexure of the stringers, of means retaining said links against separation in abnormal or sharp folding of the coupled stringers.

18. A double acting scoop for stringers of separable fasteners, comprising a scoop body having a mounting end and a coupling end, opposed surfaces of the coupling end of said body being of common construction and having projecting members at outer ends thereof and recesses inwardly of said projecting members, and said recesses terminating at side surfaces of said scoop body in notches.

LOUIS H. MORIN.